United States Patent Office 2,762,702
Patented Sept. 11, 1956

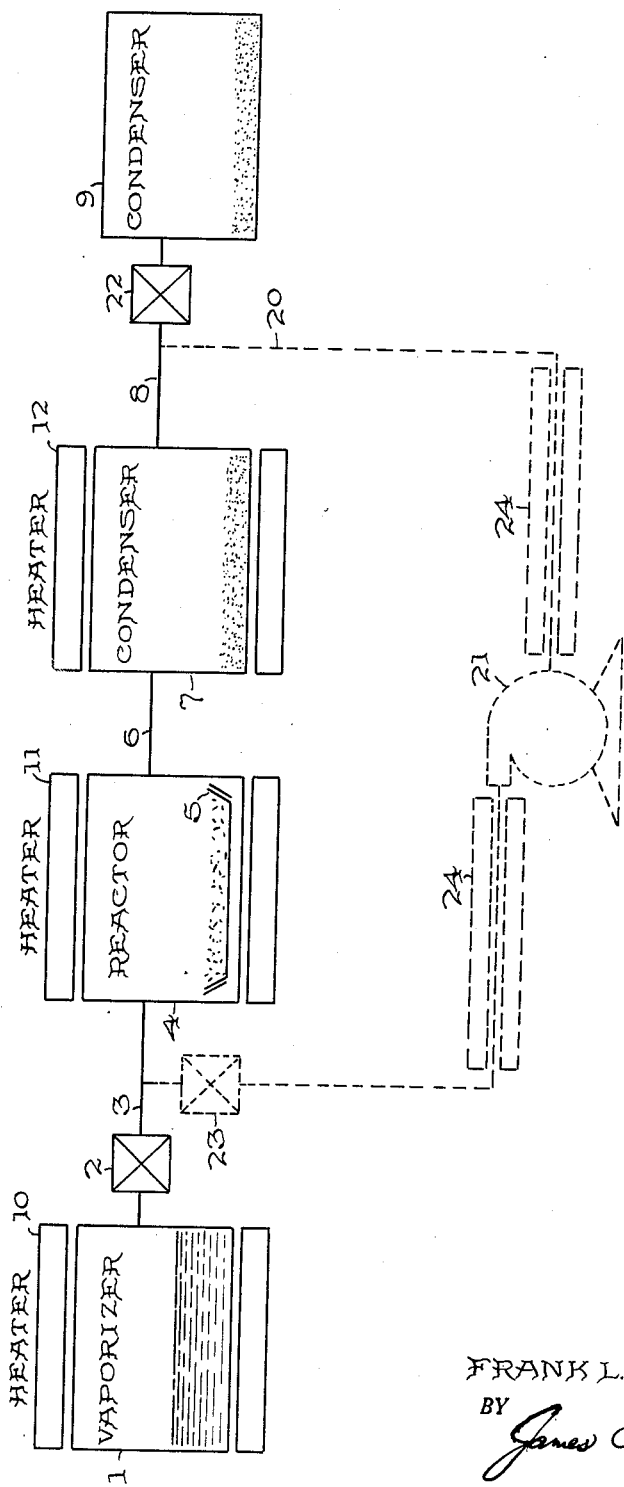

2,762,702

PROCESS OF DISTILLING METALS WITH HALIDE VAPORS

Frank L. Howard, Spokane, Wash., assignor to Kaiser Aluminum & Chemical Corporation, Oakland, Calif., a corporation of Delaware Application September 29, 1952, Serial No. 312,025

8 Claims. (Cl. 75—68)

This invention relates to the production and refining of metal. More particularly, the invention relates to an improved process for the production and refining of aluminum by the use of halides in vapor form.

Heretofore it has been proposed in the production or refining of normally non-volatile metals which have not a sufficiently high vapor pressure at technically practicable temperatures for direct distillation, such as aluminum, to pass suitable halide vapors into contact with the metal or material in a suitable reactor at a suitable temperature to cause the metal to volatize in the form of an unstable monohalide and thereafter to pass the reaction products into a condenser wherein high purity metal is condensed out separately from the halide vapor. The preferred halide vapor is the chloride which is generated by vaporization directly from the solid state to the vapor state. Other halides, such as the fluoride, have also been proposed as suitable.

This prior manner of generating the halide vapor necessary for reaction with the normally non-volatile metals has been found to have certain disadvantages which are very objectionable in normal plant operation. The heat transfer rates from the heating medium, i. e., the container or receptacle for holding the solid halide, to the solid chloride are relatively low and non-uniform thereby greatly reducing the rate of production of refined metal from a given quantity of halide in a given time. It is believed that this low and non-uniform rate of heat transfer from the heating medium to the solid halide is due in part to the fact that in the sublimation of a suitable halide, such as aluminum trichloride, which commonly contains a small amount of moisture, a crust of non-volatile material (possibly oxide or oxychloride) forms at the heated surfaces of the halide. This crust is generally quite porous in nature and is light colored. These conditions, in addition to the fact that the crust is filled with vapor, render the crust an effective thermal insulation thereby greatly reducing the rate of sublimation. Moreover, where continuously increasing amounts of heat are applied in order to attempt to keep a satisfactory flow of vapor passing into the reactor, the temperature may rise to such an extent as to cause burning out of the receptacle containing the halide. Also, such increases in temperature, which generally result in varying or non-uniform rates of vapor flow will cause the carry-over of condensed metal into the halide condenser and of halide vapor into the vacuum system.

Another undesirable feature of transforming the halide directly from the solid to the vapor state is that in a continuous process for producing or refining the metal there generally is provided a vacuum pump for removing and maintaining the air in the system at a minimum. The use of such a pump naturally tends to remove or draw off a certain portion of the halide vapor which necessarily needs to be replaced to give optimum production. Where the additional halide vapor is added by means of the sublimation of solid halide, which necessarily entails the use of suitable connecting apparatus, the time element needed to produce sufficient halide vapor increases the tendency for loss of vapor out of the system and leakage of air into the system. This difficulty is also present in the batch system since the longer the period of time necessary to refine a given amount of metal the more tendency for the passage of air into and vapor out of the system.

It is therefore a primary purpose and object of this invention to provide a novel process for the production or refining of aluminum which overcomes the disadvantages heretofore present in the art.

Another object is to provide a novel process for the production or refining of aluminum wherein the time necessary to produce or refine a given amount of aluminum is greatly reduced.

Another object is to provide an improved process for the production or refining of aluminum wherein trihalide in vapor form is passed into contact with aluminous material to form an unstable aluminum halide which is thereafter caused to condense to produce high purity aluminum and wherein the leakage of vapor from the system and the entrance of air into the system is maintained at a minimum.

Another object is to provide an improved process for the production or refining of aluminum by contact with chloride vapor wherein the volume of halide vapor free to react with the metal in a given time is greatly increased.

Another object is to provide an improved process for producing or refining aluminum by the halide vapor process utilizing aluminum trichloride wherein the rate of heat transfer to the halide in the vapor generator is increased and is uniform and where the rate of flow of vapor into the reactor is uniform.

Another object is to provide an improved batch process for producing or refining aluminum utilizing chloride vapor wherein the vapor entering the reactor can be readily controlled.

Another object is to provide an improved process for producing or refining of aluminum by the halide vapor process wherein the system may be replenished with vapor with a minimum of time and therefore a minimum of passage of air into the system.

Briefly stated, it has been found that where the halide vapor is generated from liquid halide rather than directly from halide in the solid state greatly improved heat transfer rates from the receptacle containing the halide to the halide can be achieved. Also it has been found that the amount of vapor generated in a given time is increased many times by vaporizing the liquid halide. Moreover, the rate of flow of the vapor into the reactor when produced from the liquid halide is uniform and can be readily metered.

More specifically, it has been found that the normal halide process for refining or producing of aluminum can be greatly facilitated by enclosing the solid halide in a suitable receptacle and heating the halide to at least its "triple point." By "triple point" is meant that point on the phase diagram for a material where the liquid, gas, and solid phases of the material are at equilibrium. For any material capable of existing in the above three phases at one time, the "triple point" designates a definite temperature and corresponding pressure. For example, in the case of aluminum trichloride ($AlCl_3$), the temperature of the triple point is approximately 193° C. and the corresponding pressure is approximately 2 atmospheres. Inasmuch as for any material capable of existing in the three phases of gas, liquid, and solid there is a definite triple point, the conditions for which necessarily define a definite temperature and corresponding pressure, reference to the "triple point" hereinafter will be made in terms of these triple point temperature and pressure conditions.

In the practice of the invention the essential feature is that the liquid phase of the halide be present. By heating the solid halide to the triple point temperature, or above, the liquid phase will be present. It is to be understood that as the temperature is increased above the triple point temperature there will be a corresponding increase in the pressure above the triple point pressure. Although the halides may be used satisfactorily over wide ranges of temperatures above the triple point temperature, it is preferred to operate at temperatures not appreciably in excess of the triple point. For example, aluminum trichloride can be satisfactorily used at temperatures, and corresponding pressures, up to 100° C. above the triple point temperature (193° C.) or over although it is preferred to maintain the chloride at a temperature of from about 195° to 205° C. wherein the pressure will generally not be appreciably over about 3 atmospheres. No particular advantage has been found in utilizing greatly increased temperatures. Moreover, the use of increased temperatures gives rise to increased heating costs as well as to operational problems involved in the presence of higher pressures.

By producing the halide vapor from the liquid state under a pressure substantially greater than that existing in the reactor, an increased and more uniform heat transfer rate is had as distinguished from transforming the solid halide directly into the vapor state. One possible theory for this advantageous feature is that in boiling from the liquid halide under pressure, the non-volatile crust discussed hereinbefore tends to be suspended in the liquid phase rather than forming an insulating scale or layer as in the case where sublimation of the solid halide is practiced. It is to be understood, however, that the instant invention is not to be limited by the above possible theory, it being sufficient to state that the advantages enumerated above result from practicing the operational steps set forth.

As a specific example of the greatly increased heat transfer rate and corresponding vaporization rates produced by utilizing the halide in the liquid state, 50 pounds of solid technical grade anhydrous aluminum trichloride was charged into and melted in a horizontal vaporizer vessel being 48" in length and 6" inside diameter. The vaporizer was heated by means of a sleeve-type electrical heater which surrounded the vaporizer. The vaporizer was then connected through a flow-control throttling valve to a reactor and a condenser maintained at a pressure approximating that of atmospheric and heating commenced. During a period of approximately 2 hours, 16.7 pounds of aluminum trichloride were vaporized from the vaporizer vessel, at a temperature of about 200° C. within the liquid chloride and with a vessel shell temperature of about 210° C. This vaporization rate corresponded to a heat transfer rate (from the vessel wall to the boiling aluminum chloride) of about 5 cal./hr.-cm.$^2$-° C.

By contrast, a similar run was made without a flow-control valve and with the vaporizer subliming aluminum trichloride directly from the solid state at approximately atmospheric pressure as in the prior art. During a similar time period of heating, only 2.6 pounds of aluminum trichloride were vaporized with the temperature of the vessel shell being about 210° C., as above, and with the subliming solid aluminum trichloride being at a temperature of about 180° C. The vaporization rate resulting from sublimation of the solid corresponded to a heat transfer rate of about 0.7 cal./hr.-cm.$^2$-° C. It was also noted in this test run that the rate of sublimation decreased during the test, presumably because of the thermal insulation effect of the fluffy residue of impurities from the chloride.

From the above example it can readily be seen that by generating the halide vapor from the liquid phase, a more uniform rate of vaporization and a greatly increased volume of vapor per unit time is produced. The heat transfer rate where liquid chloride was used was approximately 7 times that of the solid chloride.

Not only has the conversion of the halide from the liquid to the vapor state resulted in an increased rate in the refining or production of normally non-volatile metals, such as aluminum, but by practicing the instant invention increased operational control of the flow of halide vapor may be achieved. This improved control will be more clearly understood by reference to the drawing which is a diagrammatic illustration of one embodiment of the invention in the production or refining of aluminum by the batch process. The vaporizer vessel 1 is connected to reactor 4 by means of a suitable conduit 3. Provided in conduit 3 is a flow-control or throttling valve 2. Reactor 4 is provided with a receptacle 5 which contains the metal to be treated. Connected to the reactor 4 by means of conduit 6 is a condenser 7 which condenses out the refined metal. Another condenser 9 is connected to condenser 7 by means of conduit 8, this condenser being at a lower temperature than condenser 7 to facilitate condensing the halide vapor to solid state. The vaporizer 1, reactor 4 and condenser 7 are suitably heated by electric, gas or other forms of suitable heaters or furnaces 10, 11 and 12, respectively.

In the operation of this batch process as, for example, when aluminum trichloride is the halide, the halide in the vaporizer is heated to a temperature in the neighborhood of its "triple point" temperature, i. e., about 193° C. or higher, with valve 2 in the closed position. Within a relatively short time the halide will be converted into its liquid-vapor phases. The flow-control valve 2 is then opened to allow a metered flow of halide vapor to pass into the reactor 4 which is maintained at a pressure substantially less than that existing in the vaporizer. It is preferred to maintain a pressure of from about 10 to 100 mm. Hg in the reaction zone. However, higher or lower pressures can be satisfactorily used. The vapor thereupon reacts with the aluminum material contained in receptacle 5 to form aluminum monohalide vapor. The temperature of the reactor is generally in the range from about 850–1100° C. or higher. This monohalide vapor, which is unstable, then passes through conduit 6 into condenser 7 which is maintained at a temperature cooler than that of the reactor to cause the high purity aluminum to condense out and deposit on the bottom and walls of the condenser. The temperature of condenser 7 may preferably be from about 200–750° C. Where a temperature of from 675–750° C. is utilized, which is above the melting point of aluminum, suitable tapping means can be provided in the condenser for periodically removing the condensed aluminum. The temperature of the condenser is maintained such as to be low enough to cause condensation of the aluminum while not so low as to cause condensation of the trihalide vapor which reforms. The trihalide vapor passes into a suitable condenser 9 which is maintained at a sufficiently low temperature, as by water cooling, to condense the vapor to solid halide which then can be reused in the next batch operation. Alternatively, the batch process may be converted into a continuous process and the trihalide vapor recycled by means of conduit 20 and pump 21 back into the input end of the reactor 4. Where the vapor is recycled in the form of a continuous process, a regulating valve 22 is provided in conduit 8 to prevent vapor from passing into condenser 9 and a regulating valve 23 is provided in conduit 20 at the entrance to conduit 3 and is in open position to allow recycling of the vapor. Conduit 20 may also be provided with a suitable heating jacket 24 for maintaining the recycled halide in vapor form and at a temperature such that upon entrance to reactor 4 the desirable operating temperature of the reactor is maintained. In such a continuous operation, the liquid trihalide in vaporizer 1 will be vaporized to furnish sufficient vapor for the system and then flow control valve 2 is closed. At such time as loss of trihalide vapor due to leakage or the action of the vacuum pump normally used in such a system requires replenishment, valve 2 may be opened and the system immediately replenished in trihalide vapor. Alternatively, once sufficient vapor has been supplied to the system, valve 2 may be merely substantially closed thereby allowing a very small amount of vapor to continuously be passing into the system inasmuch as leakage of vapor out of the system is generally one of a continuous nature.

It is thus seen that by the instant invention close operational control may be had of the process. Since the halide vapor in the vaporizer is under substantially higher pressure than that existing in the reactor the use of the flow-control valve facilitates a metered flow of vapor into the reactor. It is to be noted that although the flow-control or throttling valve is illustrated as being connected to the vaporizer in the upper part of the vessel, i. e., where the halide vapor phase exists, it is contemplated, within the scope of the invention, that the valve may be located below the surface of the liquid halide in the vessel. In this way, the liquid halide would be metered into conduit 3 where it is immediately vaporized due to the passage of the liquid halide into a low pressure area. In either position of the flow-control valve it is now possible to have a closely controlled flow of uniform halide vapor into the reactor which is highly desirable for quality control and optimum production in a large plant operation. Moreover, it has been found, according to the invention, that any tendency for burn-outs to occur in the vaporizer due to increased temperatures necessary for maintaining a satisfactory flow of halide vapor, as in the case of solid halide, has been completely eliminated. Moreover, by the use of the instant invention, the replenishment of halide vapor in the system can be accomplished in a minimum period of time thereby further reducing the tendency of air to leak into the system.

It may be desirable in certain instances to use a suitable inert carrying gas, such as helium, since such a gas tends to reduce leakage of the air into the system. It has been found, however, that the use of such a gas tends to reduce the metal recovery. Although the theory of the reactions which take place is not thoroughly understood, it is postulated that the inert gas tends to cause supercooling of the monohalide vapors. The inert gas tends to sweep the vapors from the condenser zone and cause them to freeze in space as a mist or fog. This fog, which is at least partially composed of a portion of the high purity metal in the form of fine condensed particles, may pass into the trihalide condenser or, where the halide vapor is recycled, may tend to be deposited out on the recycling conduits. Under conditions where an inert gas is not used and where the temperature in the metal condenser is not above the melting point of the condensed metal, the monohalide will tend to condense out on the walls and bottom of the condenser thereby forming a coating of high purity metal.

In the specification and appended claims, the term "aluminum material" is intended to include not only high purity aluminum, but also aluminum alloys, aluminum compounds such as the carbide of aluminum, as well as any other material from which aluminum may be extracted by the halide vapor process. The material to be refined may be in the liquid or solid state.

It is to be noted that although the specific example disclosed pertains to the production or refining of aluminum and the use of aluminum trichloride as the halide, the instant invention is eminently suited for application in producing or refining other normally non-volatile metals and with the use of other halides.

It will be understood that various changes and modifications may be made in the instant invention without departing from the spirit and scope thereof.

What is claimed is:

1. In a process for distilling a normally non-volatile metal from material bearing the same wherein the metal contained in the material is reacted at elevated temperatures with the vapor phase of a halide generated directly from the solid state to vaporize said metal as its unstable lower halide and then converting said lower halide into metal and a stable halide by condensation of the metal brought about by cooling to recover the metal therefrom, the improvement comprising generating said halide vapor from the liquid state by maintaining the halide under conditions of temperature and pressure at least at the triple point of said halide.

2. A process according to claim 1 wherein the metal is aluminum.

3. A process according to claim 2 wherein the halide is the chloride.

4. In a process for distilling aluminum from material bearing the same wherein a higher halide of the metal is transformed into vapor directly from the solid state, the said vapor passing into a reaction zone containing said metal to vaporize said metal as its unstable lower halide and then converting the lower halide into metal and the higher halide by passage of said unstable halide vapor into a condenser zone, the improvement comprising generating said higher halide vapor directly from the liquid state under substantially higher pressure than that existing in the reaction zone by maintaining the halide under conditions of temperature and pressure in excess of its triple point and maintaining a controlled flow of said higher halide vapor into said reaction zone whereby the distillation of said metal per unit of time is greatly increased.

5. A process according to claim 4 wherein the process is one of the batch type.

6. A process according to claim 4 wherein the process is one of the continuous type and wherein any higher halide vapor lost from the system is replenished by passing into said system a measured amount of vapor under a pressure substantially greater than that existing in the reaction zone.

7. In a process of producing or refining aluminum from aluminum containing material wherein aluminum trichloride is vaporized directly from the solid state, the vapor passing into a reaction zone containing said aluminum containing material, whereby the aluminum contained therein is vaporized as aluminum monohalide, and thereafter converting said monohalide into aluminum and trihalide vapor by passage of said monohalide vapor into a condenser zone, the improvement comprising generating said trihalide vapor directly from the liquid state under substantially higher pressure than that existing in the reaction zone by maintaining said trihalide at least at its triple point temperature and corresponding pressure and passing a controlled flow of vapor into said reaction zone.

8. A process according to claim 7 wherein the temperature of said aluminum trichloride is from about 195° to 205° C.

References Cited in the file of this patent

UNITED STATES PATENTS

| | | |
|---|---|---|
| 2,184,705 | Willmore | Dec. 26, 1939 |
| 2,205,854 | Kroll | Jan. 25, 1940 |
| 2,236,234 | Hanak | Mar. 25, 1941 |
| 2,470,305 | Gross | May 17, 1949 |
| 2,470,306 | Gross | May 17, 1949 |
| 2,621,120 | Pedersen et al. | Dec. 9, 1952 |